United States Patent [19]
Ferkel et al.

[11] Patent Number: 6,087,628
[45] Date of Patent: Jul. 11, 2000

[54] METHOD AND APPARATUS FOR CONTROLLING A WELDING POWER SUPPLY

[75] Inventors: Stephen Ferkel; Steven Geissler, both of Appleton, Wis.

[73] Assignee: Illinois Tool Works Inc., Glenview, Ill.

[21] Appl. No.: 08/876,891

[22] Filed: Jun. 16, 1997

[51] Int. Cl.⁷ .................................................. B23K 9/067
[52] U.S. Cl. .................................... 219/130.5; 219/130.4
[58] Field of Search ........................... 219/130.5, 130.51, 219/137 PS, 130.21, 130.4; 363/41

[56] References Cited

U.S. PATENT DOCUMENTS

| | | | |
|---|---|---|---|
| 3,598,954 | 8/1971 | Iceland et al. | 219/130.51 |
| 3,781,508 | 12/1973 | Dauer et al. | 219/130.51 |
| 4,092,517 | 5/1978 | Woodacre | 219/137 PS |
| 4,876,433 | 10/1989 | Kashima et al. | 219/130.51 |
| 5,365,035 | 11/1994 | Poulsen et al. | 219/137 PS |
| 5,444,356 | 8/1995 | Reynolds et al. | 363/41 |

*Primary Examiner*—Clifford C. Shaw
*Attorney, Agent, or Firm*—George R. Corrigan

[57] ABSTRACT

A welding machine that includes a power supply having at least one control input is described. The power supply is capable of providing an electrode positive and an electrode negative output. Also, the magnitude and balance of the output is controllable. The machine includes a controller that controls the power supply. If the user selects an electrode negative output the controller causes the output to be electrode positive at at least a first magnitude for a predetermined period of time at the start of the welding process. Then, the controller causes the output to be electrode negative at a magnitude equal to or greater than a second magnitude. Thereafter, the controller causes the output to be a user selected magnitude. If the user selects an ac mode, the electrode positive portion of the output is not constantly responsive to at least one of the user selected frequency and the user selected balance.

40 Claims, 2 Drawing Sheets

METHOD AND APPARATUS FOR CONTROLLING A WELDING POWER SUPPLY

FIELD OF THE INVENTION

The present invention relates generally to the art of electric arc welding power supplies. More specifically, it relates to controlling an electric arc welding power supply by providing a desirable starting current magnitude and polarity, and by providing for a balance control that prevents an undesirable balance at certain frequencies.

BACKGROUND OF THE INVENTION

Gas tungsten arc welding (GTAW), also called tungsten inert gas (TIG) welding, is a well known method for welding metals, in particular aluminum and magnesium. There are many known power supplies for TIG welding. Among known power supplies are phase control power supplies and inverter based power supplies. One commercially available power supply is the Miller XMT 304™. U.S. patent application No. 08/584,412, now abandoned, which is hereby incorporated by reference, describes the power supply and controller used by the Miller XMT 304™.

Prior art power sources, when used for GTAW, are typically ac squarewave power sources. An ac squarewave power source provides a single phase output having a straight polarity (electrode negative) portion of a cycle and reverse polarity (electrode positive) portion of a cycle, with a rapid transition therebetween. It is best to have the option of selecting straight polarity, reverse polarity or alternating polarity welding from the same welding machine. Such a machine has a wider range of applications and is more desirable to the purchaser.

Some dc TIG welding applications are difficult to initiate. Specifically, it is well known in the prior art that it is difficult to start an arc when the electrode is negative. Conversely, when the electrode is positive the arc will start much easier. However, most dc GTAW is done with the electrode negative, when it is difficult to start.

Thus, one prior art GTAW inverter power supply provided an arc starting capability wherein the arc is started with a brief electrode positive polarity, even if the user selected a dc electrode negative output. This power supply is described in U.S. Pat. No. 5,444,356, which is hereby incorporated by reference. Also, when in the ac GTAW mode it provided an extended electrode positive period in order to facilitate arc starting. However, with that type of starting control, if the user selects a low output dc current with which to weld, the arc might not restart when the polarity initially switches from electrode negative to electrode positive.

A square wave output having independently adjustable duration of the two half-cycles (positive and negative) is desirable for GTAW welding. In other words, it is desirable to have the positive half cycle duration be controllable to be longer or shorter than the negative half-cycle. Hereinafter independent control of the positive and negative half-cycle widths is called adjustable balance.

AC TIG welding with adjustable balance is desirable because when the electrode is positive (with respect to the work piece) the work piece is cleaned by the arc. This is called the cleaning portion of the cycle. However, most of the energy that creates the weld is provided when the electrode is negative (with respect to the work piece). This is called penetration. Adjustable balance allows the user to select between varying amounts of penetration and cleaning as necessary for the particular welding job. It is also desirable to be able to select the frequency of the output. For example, a higher frequency output may provide a tighter arc cone and produce a better weld. Alternatively, a particular size shape or type of work piece may require operation at a lower frequency.

Prior art welding power supplies typically provide a potentiometer on the front panel of the welding power supply to select between a maximum and minimum cleaning level. The potentiometer generally selects a percentage of the complete cycle as being electrode positive, with the remainder being electrode negative, or visa versa. Often, the maximum penetration is 90 percent penetration, with 10 percent cleaning.

At a higher frequency such as 200 Hz the entire cycle is 5 milliseconds: with 90% penetration there is 4.5 milliseconds of penetration and 0.5 milliseconds of cleaning. At a lower output frequency, such as 20 Hz, the entire cycle would be 50 milliseconds, the length of penetration would be 45 milliseconds and the cleaning time would be 5 milliseconds.

Unfortunately, 5 milliseconds of cleaning will often exceed the thermal constant of a pointed tungsten tip, and cause balling of the tip. Thus, in order for the user to decrease the frequency, they would have to decrease the cleaning. In other words, at lower frequencies (longer periods) the percentage of cleaning or electrode positive must be kept short enough to prevent balling of the tungsten tip. Thus, even if the operator has selected the minimum cleaning, thinking that will protect the tungsten tip, the tip could still be ruined by creating a ball.

Accordingly, it is desirable to provide a form of balance control for the AC welding power supply that helps the user avoid balling of the tungsten tip from excess cleaning, particularly when operating at lower frequencies. Also, the power supply should provide a reliable start, particularly when a dc electrode negative at a low output current is selected.

SUMMARY OF THE PRESENT INVENTION

According to a first aspect of the invention a welding machine includes a power supply that has one or more control inputs. The power supply is capable of providing an electrode positive and an electrode negative output. Also, the magnitude of the output is controllable. The machine also includes a controller that controls the power supply. The controller causes the output to be electrode positive at at least a first magnitude for a predetermined period of time at the start of the welding process if the user selects a dc, electrode negative output. Then, the controller causes the output to be electrode negative at a magnitude equal to or greater than a second magnitude. Thereafter, the controller causes the output to be a user selected magnitude.

The controller causes the second magnitude to be substantially equal to the first magnitude in one embodiment. The controller causes the output to gradually change from the second magnitude to the user selected magnitude immediately after the predetermined time has passed in another embodiment.

The controller causes the electrode positive output to have a magnitude substantially equal to the first magnitude for the predetermined period of time in another embodiment. Another alternative is that the controller causes the output to gradually change from the second magnitude to the user selected magnitude after a second predetermined time, subsequent to the first predetermined time, has passed. Another alternative is to have the controller cause the output to be substantially equal to the second magnitude after the predetermined time has passed, in the event the user selected magnitude is greater than the second magnitude.

According to another aspect of the invention a welding machine includes a controller and a power supply that has one or more control inputs. The power supply is capable of providing an electrode positive and an electrode negative output. The power supply has a balance input that is connected to a balance control output on the controller. The balance control output has an electrode positive portion and an electrode negative portion. The controller has a user selected frequency input. The electrode positive portion is not constantly responsive to at least one of the user selected frequency and the user selected balance.

According to one alternative the electrode positive portion is decreasingly responsive to changes in the user selected balance as the user selected frequency increases. The electrode positive portion is increasingly responsive to changes in the user selected frequency as the user selected balance decreases, according to another alternative.

Another embodiment provides that the electrode positive portion is limited so as not to exceed a preset value at at least one user selected balance. Yet another embodiment provides that the electrode positive time is predominantly a fixed time at a user selected maximum cleaning. In another embodiment the electrode positive time is predominantly a fixed percentage at a user selected maximum penetration. Another embodiment provides that the electrode positive time is equal to $((T/2-K)*B/K_2)+K$, where T is the period, B is the user selected balance input value, and K and $K_2$ are scalars.

Other principal features and advantages of the invention will become apparent to those skilled in the art upon review of the following drawings, the detailed description and the appended claims.

Figure 1:
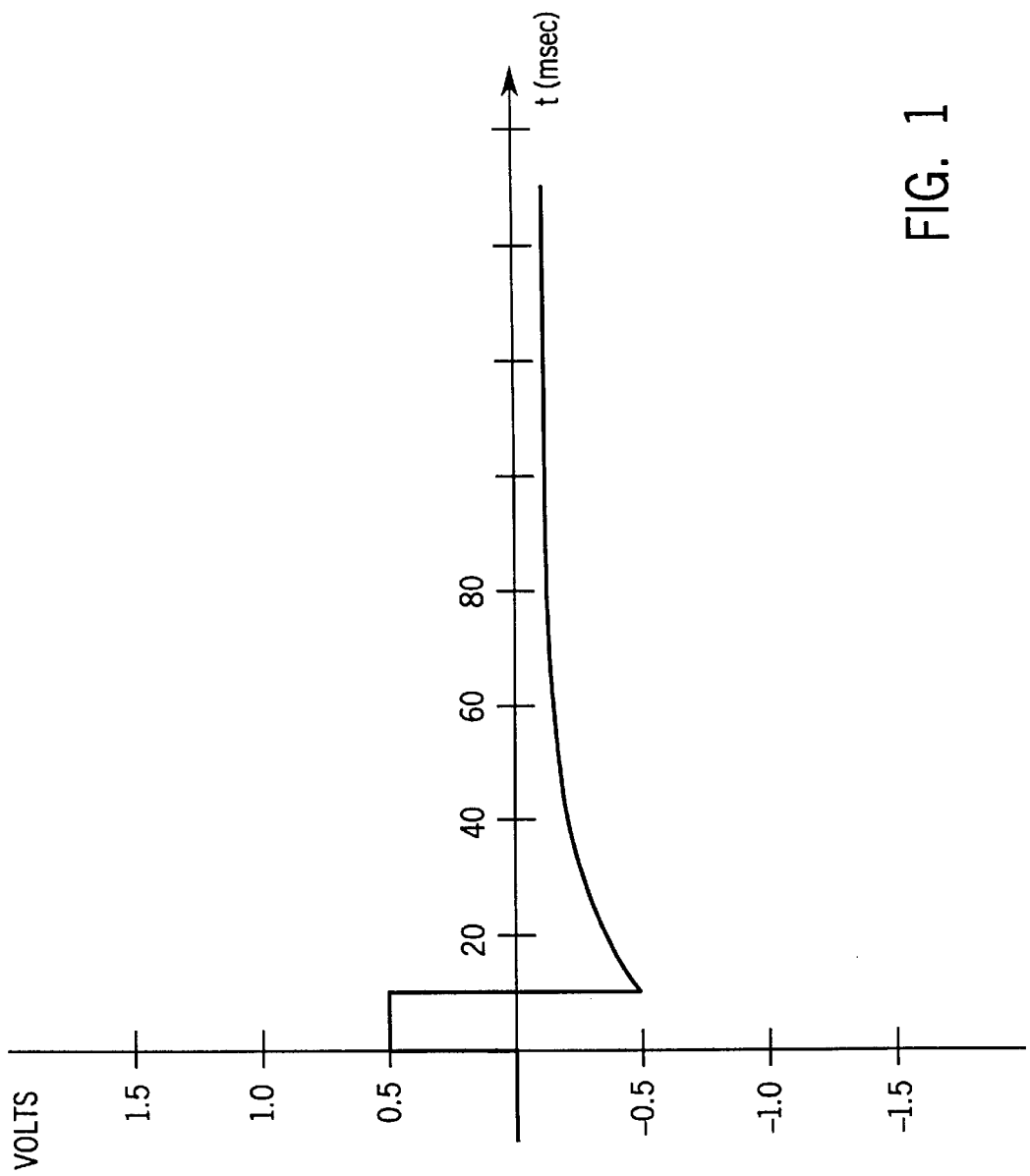
FIG. 1 is a graph showing the output current command reference and polarity using the arc starting control of the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular welding power supply inverter and a particular controller, it should be understood at the outset that other power supplies and controllers can also be employed for accomplishing the objectives of this invention. The applicants have invented a welding power supply with a controller that provides for reliable starts even when low output dc, electrode negative, is selected, and a controller that provides for a balance control that may be used over the entire range of output frequencies.

Generally, one aspect of the present invention includes providing a period of electrode positive output current at a magnitude sufficient to reliably start the arc (20 amps in the preferred embodiment) when the welding process is initiated (i.e. when the user tries to strike an arc), even when the user selects a dc, electrode negative, output. The electrode positive start time remains on for a predetermined period of time (10 milliseconds in the preferred embodiment), which allows the arc to become stable. As discussed above it is easier to start in electrode positive than electrode negative. Then, the output current is caused to be electrode negative, but at a preselected magnitude (20 amps in the preferred embodiment) great enough to insure the arc will reignite when the current reverses to electrode negative. The output then gradually changes to the user selected output. Thus, even if the users selects a low magnitude output, the arc will be reliably started.

A series converter (SRC) such as that described in U.S. patent application 08/584,412 now abandoned is used in the preferred embodiment. That SRC is followed by an H-bridge inverter. Thus, the bus for the inverter is provided by the SRC. The output current magnitude is determined by the SRC, which is controlled as set forth in U.S. patent application No. 08/584,412 now abandoned. The polarity, balance, and the output frequency is determined by the switching of the H bridge. Either an analog or digital (or both) controller may be used.

FIG. 1 is a graph showing the current command and output polarity at the initiation of the welding process, in accordance with the preferred embodiment of the present invention. The shape of the output current wave form of the welding power supply of the preferred embodiment will generally follow the current command wave form.

The vertical axis of FIG. 1 denotes the voltage of the current command and the output polarity, where each division represents 0.5 volts. One volt of the current command translates to approximately 30 amps output current for the preferred embodiment. The horizontal axis denotes time, where each division represents 20 milliseconds. The curve of FIG. 1 shows the starting current command when the user has selected an output current of about 2 amps, and selected a dc, electrode negative, polarity.

Time t=0 denotes when the user desires the welding process to begin. The current command is quickly switched from 0 to about +0.6 volts at that time. The current command remains at about 0.6 volts for 10 milliseconds. Thus, about a 20 amp, electrode positive, output is provided for the first 10 milliseconds, even though the user selected an output of 2 amps, electrode negative.

Then, the current command rapidly changes to about –0.6 volts. This corresponds to an output of about 20 amps, electrode negative. The components that implement the preferred embodiment merely leave the magnitude of the current command at about 0.6 volts, but reverse the polarity. The 20 amps electrode negative is selected to ensure a stable current reversal, even if the user selects a low magnitude output. The output current then ramps down over the next 100 milliseconds to the user selected 2 amps, electrode negative, for example. Thus, the user is provided with a reliable start.

Alternatives to the preferred embodiment include having a different electrode positive and electrode negative time or magnitude, or providing a plateau on the electrode negative temporarily increased current. Additionally, wave shapes other than a plateau (such as a varying output current or a current spike) could be used for the electrode positive time. The graph is shown with respect to a user selected dc output, but it could be easily used with an ac output. In one alternative the start as described above is used for all dc electrode negative welding, no matter what magnitude the user selects. In another alternative, the electrode positive time is provided, and if the user selected magnitude is greater than 20 amps, then the user selected magnitude is provided after the first predetermined time, for example, 10 milliseconds.

Figure 2:
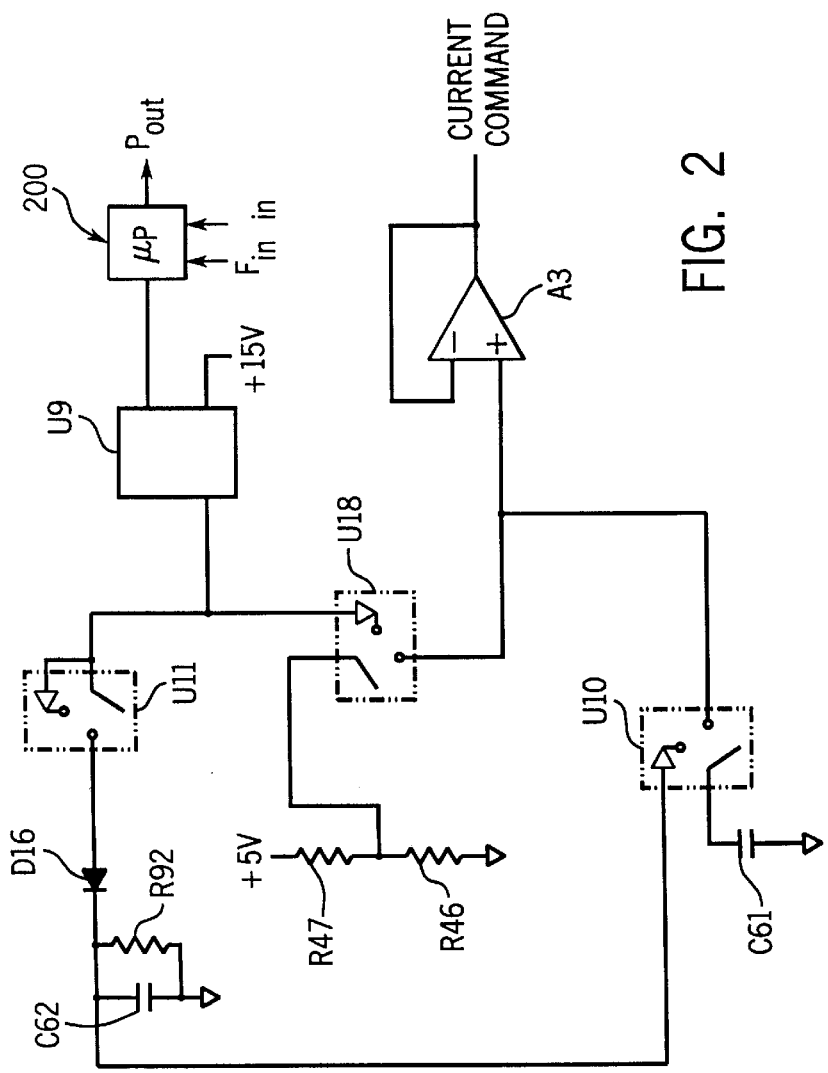
FIG. 2 is a circuit diagram of a circuit that implements the starting control of the present invention.

A circuit diagram which implements the preferred embodiment is shown is FIG. 2 and includes a plurality of resistors R47 (6.81K ohms), R46 (1K ohm), and R92 (392K ohms), a pair of capacitors C62 (0.68 microfarads) and C61 (0.33 microfarads), a plurality of digital switches U18, U10 and U11, a diode D16, a level shifter U9, an op amp A3 and a microprocessor 200. This circuit provides the timing and magnitude of the current command at the start of the welding process, as shown in FIG. 1. Microprocessor 200 selects the output polarity, and assists in the timing.

Microprocessor 200 controls the length of time the initial electrode positive 20 amp output is provided (10 milliseconds in the preferred embodiment). Specifically, microprocessor 200 sends a signal to level shifter U9 which has an output that then shifts from zero volts to +15 volts. This occurs at the initiation of the welding process. Microprocessor 200 also selects the output polarity to be electrode positive.

The output of level shifter U9 is provided to digital switch U11. When level shifter U9 shifts to the +15 volts at the initiation of the welding process it turns on, and holds on, digital switch U11. Digital switch U11 then turns on digital switch U10 through diode D16. Also, capacitor C62 quickly charges.

Level shifter U9 also turns on, and holds on, digital switch U18 when the output of level shifter U9 goes to +15 volts. A voltage divider comprised of resistors R46 and R47 is provided through switch U18 to the input of op amp A3. Op amp A3 is configured as a buffer, and its output is the magnitude of the current command. Thus, the voltage from voltage divider sets the initial current magnitude. Resistors R46 and R47 are selected so that the current command magnitude will be 0.5 volts. Also, since switch U10 is on, capacitor C61 quickly charges to 0.5 volts (set by the voltage divider).

The microprocessor causes level shifter U9 to remain in the +15 volt level, which holds the other switches closed, for 10 milliseconds. Thus, during the initial 10 milliseconds the current command will be for 20 amps, electrode positive.

After 10 milliseconds pass microprocessor 200 causes the output to be electrode negative, and sends a command to level shifter U9 which causes the output of level shifter U9 to shift to zero volts. When the output of level shifter U9 changes to zero volts, digital switches U11 and U18 are turned off. Thus, the voltage divider is removed from the current command output.

Digital switch U10 is held on, after digital switches U11 and U18 are turned off, by capacitor C62, for a length of time determined by the time constant of capacitor C62 and resistor R92. The values of capacitor C62 and resistor R92 are, in the preferred embodiment, such that digital switch U10 is held on for 100 milliseconds. Thus, for 100 milliseconds after the initial 10 milliseconds of electrode positive, capacitor C61 is connected to the current command through switch U10.

Capacitor C61 was charged to 0.5 volts, thus the output current is 20 amps, but switches to electrode negative. The current will then decay to the user selected current according to a slope set by capacitor C61. The decay will last for the length of time set by capacitor C62 and R92, which is 100 milliseconds in the preferred embodiment.

Thus, it may be seen that an inventive controller that provides for a start having a period of electrode positive at the initiation of the arc, followed by a electrode negative having a magnitude sufficient to maintain the arc which then decays down to the user selected output, has been disclosed.

The controller of the present invention also includes a balance control that prevents balling of a tungsten electrode at high penetration and low frequency. A flow chart showing the implementation of the preferred embodiment is shown in FIG. 3 and includes 4 steps.

This control is implemented using a microprocessor in the preferred embodiment, but could alternatively be implemented using an analog circuit or other known control methods. The inputs to the microprocessor include a 0 to 10 volt signal derived from a potentiometer on the front panel for the user selected frequency (Fin), and a 0 to 10 signal derived from a potentiometer on the front panel for the user selected balance (Bin). The microprocessor used for implementing this invention may be the same microprocessor used to implement initial welding polarity control described above. Accordingly, on FIG. 2 microprocessor 200 includes an input Fin for the frequency selected and Bin for the voltage selected. A polarity control output (Pout) is also provided.

Figure 3:
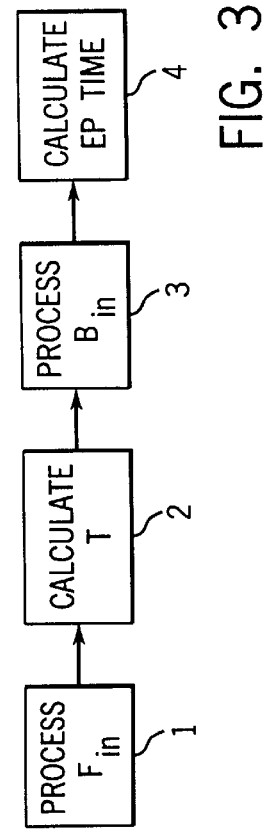
FIG. 3 is a flow chart showing the balance control in accordance with the present invention.

Referring now to FIG. 3, step 1 is digitizing and scaling the frequency selected by the user. The preferred embodiment provides that the lowest frequency selectable, 20 hertz, corresponds to a zero volt input from the potentiometer. The highest selectable frequency is 250 hertz and corresponds to a 10 volt potentiometer setting. Frequencies in between are assigned linearly with the end points.

Upon completion of step one step two is performed. The microprocessor calculates the total period T for the selected frequency in step two. Thus, at 20 hertz the total period (i.e., the electrode positive time plus the electrode negative time) will be 50 milliseconds and at 250 hertz the period will be four milliseconds.

The microprocessor reads and digitizes the output of the balance potentiometer (Bin) in step three. The preferred embodiment provides that Bin=10 volts is the maximum cleaning and Bin=0 volts is the maximum penetration. These steps may be performed in any order.

The microprocessor calculates the electrode positive, or cleaning, time in step 4. The electrode positive time is dependant upon both the frequency selected by the user and the balance potentiometer setting. Electrode positive time is determined according to the following formula: $(T/2-400 \mu sec)*(Bin/10)+400 \mu sec=EP$ time. This formula produces an EP time that is 50% of the period at one extreme (maximum cleaning) and a fixed time of 400 $\mu$sec at the other extreme (maximum penetration). Thus, the inventive balance control may be described as a fixed time at maximum penetration, a fixed percentage at maximum cleaning, and a combination therebetween. Accordingly, if the user is welding at maximum penetration, the tungsten tip will not ball up at low frequencies.

The tables below show the length of electrode positive time for the new inventive balance control, and for a prior art balance control. The table is for a prior art balance control that has a 0–10 volt potentiometer output that is used to linearly select between 50% penetration and 90% penetration with the power supply of the present invention. Three settings of the balance potentiometer are given (the maximum penetration, maximum cleaning and the midpoint of the potentiometer (5 volts). Three frequencies are shown: 250 Hz, 100 Hz, and 20 Hz.

Present Invention:

| Pot. Voltage: | 20 Hz | 100 Hz | 250 Hz |
|---|---|---|---|
| 0 | 400 μsec | 400 μsec | 400 μsec |
| 5 | 12700 μsec | 2700 μsec | 1200 μsec |
| 10 | 25000 μsec | 5000 μsec | 2000 μsec |

Prior Art:

| | | | |
|---|---|---|---|
| 0 | 5000 μsec | 1000 μsec | 400 μsec |
| 5 | 15000 μsec | 3000 μsec | 1200 μsec |
| 10 | 25000 μsec | 5000 μsec | 2000 μsec |

Using the prior art control a change of potentiometer settings from maximum penetration (0 volts) to the midpoint (5 volts) produces a three-fold increase in electrode positive time at all frequencies. Similarly, a change from 5 volts to 10 volts produces the same percentage increase (to ⅔) at all frequencies. Thus, the prior art electrode positive time is constantly responsive (its responsiveness is constant), over the entire frequency range, to balance setting changes. Also, the electrode positive time has a single response to balance setting changes.

This is contrasted with the present invention where a change of potentiometer settings from maximum penetration (0 volts) to the mid-point (5 volts) produces a greater percentage increase at lower frequencies than higher frequencies. Similarly, a change from 5 volts to 10 volts produces a greater percentage increase at lower frequencies than higher frequencies. Thus, the inventive balance control electrode positive time is decreasingly responsive (or not constantly responsive) to balance changes as frequency increase (i.e. as selected frequency increases, responsiveness to balance decreases). Also, the electrode positive time has more than one reponse to balance setting changes.

Also, it should be observed that, using the prior art control, a five fold increase in frequency (from 20–100 Hz) yields a decrease to ⅕ in electrode positive time, at all penetration settings. Thus, the prior art electrode positive time has a constant responsiveness (and only one response) over the entire balance range (potentiometer output) to frequency changes.

The inventive control is different. A five fold increase in frequency (from 20–100 Hz) yields a change of from no change at maximum penetration to a decrease to ⅕ at maximum cleaning. Thus, the inventive balance control is increasingly responsive (or not constantly responsive) to frequency changes as penetration decreases (i.e. as selected penetration increases, responsiveness to frequency decreases). Also, it has more than one response to frequency changes.

The discussion herein used the preferred embodiment of a potentiometer output as the balance selector. However, balance could be selected using a touchpad, etc. The controller could also use an analog circuit. Also, the discussion was directed toward electrode positive, but if the electrode positive time is not constantly responsive, then neither is the electrode negative time, and visa versa.

Thus, the control of the this invention will help prevent the thermal constant of the tungsten electrode from being exceeded. This is accomplished by making the length of time the output is electrode positive a function of both the frequency and the balance in such a way that the balance is not a straight percentage for a given potentiometer setting. Alternatives to the preferred embodiment include making the electrode positive time at maximum penetration predominantly a fixed time, and making the electrode positive time at maximum cleaning predominantly a fixed percentage of the period.

Thus, it should be apparent that there has been provided in accordance with the present invention a method and apparatus for providing welding power that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. Numerous modifications may be made to the present invention which still fall within the intended scope hereof.

The embodiments of the invention in which an exclusive property or privilege is claimed are defined as follows:

1. A welding machine comprising:
   a power supply having at least one control input and capable of providing an electrode positive and an electrode negative output current, and capable of having a controllable magnitude; and
   a controller connected to the control input;
   wherein, in the event a user selects a dc, electrode negative output current, the controller causes the output current to be electrode positive at at least a first magnitude for a predetermined period of time at the start of the welding process; and
   wherein the controller causes the output current to be electrode negative, having at least a second magnitude, after the predetermined time has passed; and
   wherein the controller causes the output current to be a user selected magnitude thereafter.

2. The welding machine of claim 1 wherein the controller causes the second magnitude to be substantially equal to the first magnitude.

3. The welding machine of claim 2 wherein the controller causes the output to gradually change from the second magnitude to the user selected magnitude after a second predetermined time, subsequent to the first predetermined time, has passed.

4. The welding machine of claim 2 wherein in the event the user selected magnitude is greater than the second magnitude, the controller causes the output to be substantially equal to the second magnitude after the predetermined time has passed.

5. The welding machine of claim 1 wherein the controller causes the output to gradually change from the second magnitude to the user selected magnitude immediately after the predetermined time has passed.

6. The welding machine of claim 1 wherein the controller causes the electrode positive output current to have a magnitude substantially equal to the first magnitude for the predetermined period of time.

7. A method of initiating a dc, electrode negative, welding arc from a welding machine having a power supply capable of providing an electrode positive and an electrode negative output, and capable of having a controllable magnitude; and providing an initial period of electrode positive output current having at least a first magnitude for a predetermined period of time at the start of the welding process; and providing an electrode negative current output current, having at least a second magnitude, after the predetermined time has passed; and thereafter providing an output having a user selected magnitude.

8. The method of claim 7 wherein the second magnitude is substantially equal to the first magnitude.

9. The method of claim 7 further including the step of gradually changing from the second magnitude to the user selected magnitude immediately after the predetermined time has passed.

10. The method of claim 7 further including the step of gradually changing from the second magnitude to the user selected magnitude after a second predetermined time has passed.

11. The method of claim 7 including the step of providing an electrode negative current output current, having substantially the second magnitude, after the predetermined time has passed, in the event the user selected magnitude is greater than the second magnitude.

12. A welding machine comprising:

power supply means for providing ari electrode positive and an electrode negative output at a controllable magnitude in response to a control input; and a control means for controlling the power supply means, wherein the control means is connected to the control input;

wherein, the control means includes starting means for providing an initial period of electrode positive output current having at least a first magnitude for a predetermined period of time at the start of the welding process, and for providing an electrode negative current output current, having at least a second magnitude, after the predetermined time has passed, and for thereafter providing an output having a user selected magnitude, in the event a user selects a dc, electrode negative output.

13. The welding machine of claim 12 wherein the start means includes means for causing the second magnitude to be substantially equal to the first magnitude.

14. The welding machine of claim 13 wherein the start means includes means for causing the output to gradually change from the second magnitude to the user selected magnitude after a second predetermined time, subsequent to the first predetermined time, has passed.

15. The welding machine of claim 13 wherein the start means includes means for causing the output to be substantially equal to the second magnitude after the predetermined time has passed, in the event the user selected magnitude is greater than the second magnitude.

16. The welding machine of claim 12 wherein the start means includes means for causing the output to gradually change from the second magnitude to the user selected magnitude immediately after the predetermined time has passed.

17. The welding machine of claim 12 wherein the start means includes means for causing the electrode positive output to have a magnitude substantially equal to the first magnitude for the predetermined period of time.

18. A welding machine comprising:

a power supply capable of providing an electrode positive and an electrode negative output, and having a balance control input; and a controller having a balance control output, that provides an electrode positive portion and an electrode negative portion, connected to the balance control input, and having a user selected balance control input, and a user selected frequency input;

wherein the electrode positive portion has at least two responses to changes in at least one of the user selected frequency and the user selected balances, wherein changes in balance for a given change in the user selected balance is nonlinear with respect to difference user selected frequencies.

19. The welding machine of claim 18 wherein the electrode positive portion is increasingly responsive to changes in the user selected frequency as the user selected balance decreases.

20. The welding machine of claim 18 wherein the electrode positive portion is limited so as not to exceed a preset value at at least one user selected balance.

21. The welding machine of claim 18 wherein at a user selected maximum cleaning the electrode positive time is predominantly a fixed time.

22. The welding machine of claim 18 wherein at a user selected maximum penetration the electrode positive time is predominantly a fixed percentage.

23. The welding machine of claim 18 wherein the controller calculates the electrode positive time as equal to $((T/2-K)*B/K_2)+K$, where T is the period, B is the user selected balance input value, and K and $K_2$ are scalars.

24. A welding machine comprising:

a power supply capable of providing an electrode positive and an electrode negative output, and having a balance control input; and a controller having a balance control output, that provides an electrode positive portion and an electrode negative portion, connected to the balance control input, and having a user selected balance control input, and a user selected frequency input;

wherein the electrode positive portion has at least two responses to chances in at least one of the user selected frequency and the user selected balance, and the electrode positive portion is decreasingly responsive to changes in the user selected balance as the user selected frequency increases.

25. The welding machine of claim 24 wherein the electrode positive portion is increasingly responsive to changes in the user selected frequency as the user selected balance decreases.

26. The welding machine of claim 25 wherein the power supply is capable of having a controllable magnitude, and wherein, in the event a user selects a dc, electrode negative output, the controller causes the output to be electrode positive at at least a first magnitude for a predetermined period of time at the start of the welding process; and wherein the controller causes the output to be electrode negative, having at least a second magnitude, after the predetermined time has passed; and wherein the controller causes the output to be a user selected magnitude thereafter.

27. A welding machine comprising:

a power supply capable of providing an electrode positive and an electrode negative output, and having a balance control input; and a control means for controlling the balance of the power supply output, wherein the control means is connected to the balance control input, and having a user selected balance control input and a user selected frequency input;

wherein the controller includes means for calculating an electrode positive time such that the electrode positive time has at least two responses to at least one of the user selected frequency and the user selected balance, wherein changes in balance for a given change in the user selected balance is nonlinear with respect to difference user selected frequencies.

28. The welding machine of claim 27 wherein the means for calculating calculates the electrode positive time such that the electrode positive time is increasingly responsive to changes in the user selected frequency as the user selected balance decreases.

29. The welding machine of claim 27 wherein the electrode positive portion is limited so as not to exceed a preset value at at least one user selected balance.

30. The welding machine of claim 27 wherein at a user selected maximum cleaning the electrode positive time is predominantly a fixed time.

31. The welding machine of claim 27 wherein at a user selected maximum penetration the electrode positive time is predominantly a fixed percentage.

32. The welding machine of claim 27 wherein the control mean calculates the electrode positive time as equal to $((T/2-K)*B/K_2)+K$, where T is the period, B is the user selected balance input value, and K and $K_2$ are scalars.

33. A welding machine comprising:
a power supply capable of providing an electrode positive and an electrode negative output, and having a balance control input; and
a control means for controlling the balance of the power supply output, wherein the control means is connected to the balance control input, and having a user selected balance control input and a user selected frequency input;
wherein the controller includes means for calculating an electrode positive time such that the electrode Positive time has at least two responses to at least one of the user selected frequency and the user selected balance; and
the means for calculating calculates the electrode positive time such that the electrode positive time is decreasingly responsive to changes in the user selected balance as the user selected frequency increases.

34. A method of determining balance for an ac welding machine comprising:
receiving a user selected balance;
receiving a user selected frequency;
calculating an electrode positive time such that the electrode negative time is not linearly responsive to at least one of the user selected frequency and the user selected balance.

35. The method of claim 34 wherein the step of calculating includes the step of calculating the electrode positive time such that the electrode positive time is increasingly responsive to changes in the user selected frequency as the user selected balance decreases.

36. The method of claim 34 wherein the step of calculating includes limiting the electrode positive so as not to exceed a preset value at at least one user selected balance.

37. The method of claim 34 wherein the step of calculating includes calculating a predominantly fixed time when the user selects a maximum cleaning.

38. The method of claim 34 wherein the step of calculating includes calculating a predominantly fixed percentage of the period when the user selects a maximum cleaning.

39. The method of claim 34 wherein the step of calculating includes calculating the electrode positive time as equal to $((T/2-K)*B/K_2)+K$, where T is the period, B is the user selected balance input value, and K and $K_2$ are scalars.

40. A method of determining balance for an ac welding machine comprising:
receiving a user selected balance;
receiving a user selected frequency;
calculating an electrode positive time such that the electrode negative time is not constantly responsive to at least one of the user selected frequency and the user selected balance; and
calculating includes the step of calculating the electrode positive time such that the electrode positive time is decreasingly responsive to changes in the user selected balance as the user selected frequency increases.

* * * * *